(12) United States Patent
Richter et al.

(10) Patent No.: US 9,923,359 B2
(45) Date of Patent: Mar. 20, 2018

(54) SAFETY SWITCHING DEVICE WITH A SAFE POWER SUPPLY UNIT

(71) Applicant: Pilz GmbH & Co. KG, Ostfildern (DE)

(72) Inventors: Sebastian Richter, Ostfildern (DE); Kim Le, Ostfildern (DE); Stefan Roehmann, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 412 days.

(21) Appl. No.: 14/813,558

(22) Filed: Jul. 30, 2015

(65) Prior Publication Data

US 2015/0340854 A1 Nov. 26, 2015

Related U.S. Application Data

(63) Continuation of application No. PCT/EP2014/051883, filed on Jan. 31, 2014.

(30) Foreign Application Priority Data

Feb. 1, 2013 (DE) ........................ 10 2013 101 050

(51) Int. Cl.
*H02H 3/05* (2006.01)
*H02H 3/20* (2006.01)
(Continued)

(52) U.S. Cl.
CPC ............... *H02H 3/05* (2013.01); *H02H 3/20* (2013.01); *H02H 7/1213* (2013.01); *H02H 9/041* (2013.01); *H02H 9/042* (2013.01)

(58) Field of Classification Search
CPC .......... H02H 3/05; H02H 3/20; H02H 7/1213; H02H 9/041; H02H 9/042
(Continued)

(56) References Cited

U.S. PATENT DOCUMENTS 5,815,353 A 9/1998 Schwenkel
5,936,435 A 8/1999 Schwenkel et al.
(Continued)

FOREIGN PATENT DOCUMENTS

CN 1795522 A 6/2006
CN 1875440 A 12/2006
(Continued)

OTHER PUBLICATIONS

Machine translation of Folliot et al. European Patent Document EP 1102379 A1 May 23, 2001.*
(Continued)

*Primary Examiner* — Thienvu Tran
*Assistant Examiner* — Kevin J Comber
(74) *Attorney, Agent, or Firm* — Harness, Dickey & Pierce, P.L.C.

(57) ABSTRACT

A safety switching device for an automated installation includes a power supply unit for providing at least one operating voltage for the device. The power supply unit receives an input voltage via a feed line and provides a defined output voltage on an output side. Electrical supply to the power supply unit is interrupted if an instantaneous output voltage is higher than the defined output voltage. The interruption is achieved by first and second switching elements arranged in series and connecting the input of the power supply unit to ground, and by an interrupter element in the feed line. The interrupter element triggers when both the first and the second switching elements are in a closed, low-impedance state. A reference point between the first and the second switching elements has a voltage value that corresponds to a first expectation value when the first switching element is in the closed, low-impedance state and the second switching element is in an open state, and corresponds to a second expectation value when the first (Continued)

switching element is in the open state and the second switching element is in the closed, low-impedance state.

12 Claims, 3 Drawing Sheets

(51) Int. Cl.
  *H02H 7/12* (2006.01)
  *H02H 9/04* (2006.01)
(58) Field of Classification Search
  USPC .......................................................... 361/86
  See application file for complete search history.

(56) References Cited

U.S. PATENT DOCUMENTS

| | | |
|---|---|---|
| 2006/0077613 A1 | 4/2006 | Hornung |
| 2006/0255786 A1 | 11/2006 | Schwenkel et al. |
| 2007/0090694 A1 | 4/2007 | Pullmann et al. |
| 2008/0165457 A1 | 7/2008 | Premerlani et al. |
| 2008/0278875 A1 | 11/2008 | Bauer et al. |
| 2009/0278066 A1 | 11/2009 | Keller |

FOREIGN PATENT DOCUMENTS

| | | |
|---|---|---|
| CN | 1938806 A | 3/2007 |
| CN | 201032688 Y | 3/2008 |
| CN | 101227159 A | 7/2008 |
| CN | 101305439 A | 11/2008 |
| DE | 44 36 858 A1 | 4/1996 |
| DE | 44 43 862 A1 | 6/1996 |
| DE | 10 2004 020 995 A1 | 11/2005 |
| DE | 10 2005 024 321 A1 | 11/2006 |
| DE | 10 2006 004 558 A1 | 8/2007 |
| DE | 10 2008 005 837 A1 | 7/2009 |
| DE | 10 2008 006 512 A1 | 7/2009 |
| DE | 10 2008 023 198 A1 | 11/2009 |
| DE | 10 2008 051 514 A1 | 4/2010 |
| EP | 1 102 379 A1 | 5/2001 |
| WO | WO 2007/085372 A1 | 8/2007 |

OTHER PUBLICATIONS

English translation of International Preliminary Report on Patentability (Chapter I) for PCT/EP2014/051883; dated Aug. 4, 2015; 11 pp.
CEI IEC 61508-2; Functional safety of electrical/electronic/programmable electronic safety-related systems—Part 2: Requirements for electrical/electronic/programmable electronic safety—related systems; May 2000; 152 pp.
Gunther Bernd; Safety of machinery; Notes on the application of standards EN 62061 and EN ISO 13849-1; Jun. 2007; 19 pp.
Chinese Examination Report for Appl'n. No. 201480017965.9; dated Jan. 22, 2017; 12 pp.

* cited by examiner

SAFETY SWITCHING DEVICE WITH A SAFE POWER SUPPLY UNIT

CROSS-REFERENCES TO RELATED APPLICATIONS

This application is a continuation of international patent application PCT/EP2014/051883 filed on Jan. 31, 2014 designating the U.S., which international patent application has been published in German language and claims priority from German patent application DE 10 2013 101 050.4 filed on Feb. 1, 2013. The entire contents of these priority applications are incorporated herein by reference.

BACKGROUND OF THE INVENTION

The present invention relates to a safety switching device for switching on or off switching a technical installation in a failsafe manner, and more particularly to a safety switching device having an improved internal power supply unit.

A safety switching device and a failsafe control/evaluation unit, respectively, in terms of the present invention is a switching device and a control/evaluation unit, respectively, that comply at least with PI d (performance level) in accordance with Standard EN ISO 13849-1 and/or SIL 2 (safety integrity level) in accordance with EN/IEC 62061. In particular, this includes switching devices, safety controllers and also sensor modules and actuator modules that are used for controlling and implementing safety-critical tasks in the field of industrial production environment. In particular, switching devices are known that monitor the operating position of an emergency-off button or of a protective door or by way of example the functional state of a light barrier, and in response thereto switch off a machine or machine area. A failure of safety switching devices of this type can have life-threatening consequences for the operating personnel and for this reason safety switching devices may only be used if they are approved by the relevant regulatory authorities.

In general, a safety switching device of this type comprises an input for connecting a signaling device, an output-sided switching device for failsafely switching off the load, a control/evaluation unit that controls the switching device in response to the signaling device, and a power supply unit for providing an operating voltage.

The power supply units used in safety switching devices are generally used to provide specific operating voltages for the electrical components of the safety switching devices. In general, a higher D.C. voltage or A.C. voltage is converted into one or multiple smaller operating voltages.

In the case of safety switching devices, an external power supply unit is usually used as protection against hazardous body currents in order to limit the maximal output voltage even in the case of defective components to a value that is not hazardous for humans. In the case of common safety switching devices, this maximal output voltage that must not be exceeded is usually 65 V, wherein the nominal voltage for the operation of the safety switching devices is generally 24 V.

In order to supply energy to the electrical components, the safety switching device comprises a further power supply unit that is usually integrated in the safety switching device and converts the nominal voltage of 24 V, by way of example, which is provided by the external power supply unit, into the required lower operating voltages, such as 3.3 V, 5 V or 12 V by way of example. These power supply units must be embodied so as to manage overvoltages of up to 65 V, so that even if there are any defective components within the power supply unit an overvoltage does not damage the components of the safety switching device that are to be supplied with energy.

An overvoltage protection device of this type for a safety switching device is known by way of example from DE 10 2008 051 514 A1. The known device comprises a comparator and an electrically controllable current switch-off means that interrupts the current path to the safety module in the event of an overvoltage. A disadvantage in the case of this overvoltage protection is that a defective component in the overvoltage protection circuit, in particular in the current switch-off element, can lead to an overvoltage even in the components that are to be supplied with energy and said overvoltage can damage said components that are to be supplied with energy.

DE 44 36 858 C2 discloses a further overvoltage protection device having multiple limiter elements that are connected in series, wherein this series connection is arranged between two current connections that are to be limited. The sum of forward voltages of the limiter elements defines the maximum permissible voltage between the current connections. By means of partially bridging the individual limiter elements and by reading back the voltage change at the limiter elements, it is possible to test the operativeness of the limiting elements and thus of the entire protection device. A disadvantage of this overvoltage protection device is that this measure is only effective against transient overvoltages. However, an overvoltage that is constantly present can cause damage to the components of the overvoltage protection device and thus result in an unsafe state.

Overall, a further overvoltage protection device for power supply units is known as a clamping circuit. The output voltage is monitored in the case of a clamping circuit and in the event of an overvoltage the input is short-circuited to ground by means of a thyristor. This leads to a fuse, by way of example a protective fuse, triggering and the current supply being permanently interrupted. In contrast to the previously mentioned overvoltage protection devices, the clamping circuit has the advantage that the current supply is safely and permanently interrupted. However, a disadvantage of a clamping circuit resides in the fact that the operativeness of the circuit can only be tested if the input of the power supply unit is actually short-circuited to ground and the fuse triggers. It is consequently not possible to perform a test during the running operation.

SUMMARY OF THE INVENTION

Against this background, it is an object of the present invention to provide a safety switching device that is effectively protected from overvoltages.

It is another object to provide a safety switching device where it is possible to test the protection mechanism during operation.

It is yet another object to provide a method for monitoring operativeness of a power supply unit in a safety switching device while the safety switching device is operating.

In accordance with a first aspect of the invention, there is provided a safety switching device for switching on or switching off a technical installation in a failsafe manner, comprising an input for receiving an input signal representing a safety condition, comprising a failsafe control/evaluation unit that processes the input signal in order to generate an output signal for switching on or switching off the technical installation in response thereto, comprising a power supply unit for providing at least one operating voltage for the control/evaluation unit, the power supply unit having an input side and an output side, said input side having a power input connected to a feed line and a ground connection for receiving an external input voltage provided between the feed line and the ground connection, and the power supply unit providing said at least one operating voltage at the output side, comprising a first and a second switching element arranged in series and bridging the power input to the ground connection, and comprising an interrupter element arranged between the power input and the feed line, which interrupter element triggers when both the first and the second switching elements are in a closed, low-impedance state, wherein a reference point is defined between the first and the second switching elements, which reference point has a voltage value that corresponds to a first expectation value when the first switching element is in the closed, low-impedance state and the second switching element is in an open state, and said voltage value corresponds to a second expectation value when the first switching element is in an open state and the second switching element is in the closed, low-impedance state.

In accordance with another aspect of the invention, there is provided a method for monitoring a power supply unit of a safety switching device for switching on or switching off a technical installation in a failsafe manner, the method comprising the steps of providing a safety switching device having an input for receiving an input signal, a failsafe control/evaluation unit that processes the input signal in order to generate an output signal for switching on or switching off the technical installation in response thereto, and a power supply unit that has a power input and a ground connection, said power supply unit generating at least one operating voltage for the control/evaluation unit, supplying electrical power to the power supply unit via a feed line and a ground connection, arranging a first and a second switching element in series between the feed line and the ground connection, arranging an interrupter element in the feed line, actuating the first and second switching elements in an alternating manner, and monitoring a voltage value at a reference point between the first and the second switching elements, wherein the voltage value is expected to correspond to a first expectation value in the case of a closed, low-impedance state of the first switching element and in the case of an open state of the second switching element, and wherein the voltage value is expected to correspond to a different second expectation value in the case of an open state of the first switching element and a closed, low-impedance state of the second switching element, and triggering the interrupter element in order to disconnect the power supply unit from the electrical power if the voltage value at the reference point does not correspond to either the first or the second expectation value. Preferably, the interrupter element is triggered by bringing both the first and the second switching elements into the closed, low-impedance state The overvoltage protection device of the novel safety switching device and method is thus based on the fundamental principle of a clamping circuit. The first and the second switching elements that are connected in series connect the input of the power supply unit to the ground connection. If the prevailing output voltage is greater than the defined output voltage, two switching elements are closed and the feed line is connected to ground in a low-impedance manner. The resultant high current that flows from the feed line through the interrupter element, by way of example a protective fuse, to ground, triggers the interrupter element and the power supply unit is safely and permanently separated from the feed line. A current supply to the power supply unit is completely interrupted.

In contrast to a clamping circuit known in the prior art, the overvoltage protection device comprises an additional second switching element that is connected in series to the first switching element. In order to trigger the interrupter element, two switching elements must be actuated and closed. Moreover, a reference point is defined between the switching elements and a different voltage level occurs at said reference point depending upon the state of the first or the second switching element. If only the first switching element is in the low-impedance state, by way of example a higher voltage value occurs at the reference point than if only the second switching element is in the low-impedance state. If the first and the second switching element are functioning correctly, precise expectation values for the voltage at the reference point can be determined.

The operativeness of the first and the second switching elements and associated therewith the operativeness of the entire clamping circuit can be tested in a simple manner by way of this arrangement, namely by the switching elements being individually closed and the voltage that is prevailing at the reference point being compared with the expectation values.

It is particularly advantageous that the safety function can be tested during the running operation and it is not necessary to stop a technical installation. At the same time, the protective function remains completely intact even during the testing procedure. If an overvoltage occurs while one of the two switching elements is in the low-impedance state for testing purposes, the safety function still can be triggered in that the other switching element is also transferred into the low-impedance state. The subsequently triggering interrupter element leads to the safety switching device being separated from the current supply, whereupon the technical installation is transferred by default into a safe non-hazardous state.

A further advantage of the novel invention resides in the fact that the safety switching device can achieve a PL e or SIL 3 in accordance with the above mentioned relevant safety standards EN ISO 13849-1 and EN/IEC 62061 in a very cost-effective manner as a result of it being possible to test the safety function of the power supply unit. In order to verify a PL e/SIL 3 for a part system, it is necessary to be able to indicate a diagnostic coverage rate DC. However, it is only possible to determine a diagnostic coverage rate DC if the safety function of the part system can be tested continuously. Since it is necessary in accordance with IEC 61508, a standard that is higher ranking than the EN/IEC 62061, when calculating the safety characteristic value to take into consideration a voltage supply and consequently to evaluate it as a part system, it is advantageous to continuously test its safety function. A testing procedure of this type can be achieved in a very simple manner by means of the device in accordance with the invention.

In a preferred refinement, the safety switching device comprises a control element that selectively actuates the first or the second switching element and compares the voltage value at the reference point with the first and the second expectation values.

It is possible to automate the testing procedure by means of the control unit. For this purpose, the control element alternately actuates the first and the second switching elements and compares the voltage that occurs at the reference point with the pre-configured expectation values. The expectation values are preferably stored in a memory but they can also be provided by means of variable reference elements, such as diodes or adjustable potential dividers by way of example Zener. It is possible by means of comparing the measured voltage with the expectation values to test the operativeness of the individual switching elements and consequently of the entire protection device. It is particularly advantageous in the case of this refinement that the protection device can be continuously tested.

In a further refinement, a third defined expectation value occurs at the reference point if the first switching element and the second switching element are in the open state.

If both the first and also the second switching element are in the open, i.e. non-conductive, state, a further voltage value that is different from the first and the second expectation value occurs at the reference point. It is preferred that this voltage value is a mean value of the first and the second expectation value. Furthermore, this mean value preferably depends, in particular, on the input voltage so that a defective switching element is not erroneously indicated by a fluctuating input voltage. In one embodiment, a potential divider is arranged directly downstream of the interrupter element in order to generate this mean value in a simple and cost-effective manner. The third defined expectation value can be evaluated in an advantageous manner for further plausibility tests.

In a further refinement, the interrupter element is not triggered if only one switching element is in the closed, low-impedance state.

The input of the power supply unit is only short-circuited if the two switching elements both are in the low-impedance state. Consequently, the two switching elements can be individually actuated without the interrupter element triggering. This refinement renders it possible to test the switching elements independently.

In a further refinement, the safety switching device comprises a first monitoring unit and a second monitoring unit that are connected to the output voltage, wherein the first monitoring unit actuates the first switching element if the output voltage exceeds a first defined voltage value, and the second monitoring unit actuates the second switching element if the output voltage exceeds a second defined voltage value.

In this refinement, the switching elements are actuated individually by a respective monitoring unit, wherein the first monitoring unit actuates the first switching element and the second monitoring unit actuates the second switching element. The first and the second monitoring units are connected to the output voltage of the power supply unit and are configured so that they detect a deviation of the output voltage from a first or a second defined voltage value and actuate the first and the second switching element independently of one another. It is preferred that the first and the second defined voltage values are equal. An increased output voltage consequently leads to the two switching elements being moved into the low-impedance state and the input of the power supply unit being short-circuited to ground. The first and the second monitoring units can be achieved by means of a comparator that compares the output voltage with a defined reference voltage. However, alternatively, a different circuit can also be used to detect a voltage deviation.

The first and the second defined voltage value can be adjusted in a particularly preferred refinement.

It is possible by way of the adjustable first and second voltage values to vary the voltage difference that leads to the switching elements being actuated by means of the monitoring device. It is possible in this manner to adjust the tolerance range in a flexible and simple manner.

In a further refinement, the safety switching device comprises a control element that can adjust the first and/or second monitoring unit independently of the prevailing output voltage.

It is possible by means of the control element to adjust the first and/or second monitoring unit independently of the prevailing output voltage, in other words the first and/or second monitoring unit recognizes an increased voltage even if this is not present. As a consequence, the operativeness of the monitoring unit and furthermore the operativeness of the switching elements that are controlled by way of the monitoring unit can be tested in a very simple manner and with few components in a cost-effective manner. Therefore, this refinement is particularly advantageous since in this manner the overvoltage protection function can be tested in a fully automated manner.

In a further refinement, the failsafe control/evaluation unit comprises at least two processing units that process the input signal in a redundant manner with respect to one another and perform logic signal operations in order to generate an output signal in response thereto.

The two redundant signal processing channels each having at least one processing unit contribute to the failsafety of the safety switching device. A redundant design describes one option as to how it is possible to achieve failsafety in the context of the current safety standards. A two-channel or multi-channel safety switching device renders possible the assignment into PI d or SIL 2 of the relevant safety standards.

In a particularly preferred refinement, the two processing units of the control/evaluation unit require different operating voltages that have to be provided by the power supply unit.

The diverse redundancy created by means of different voltage requirements for the processing units renders it possible to increase the failsafety. In the case of voltage drops, the processing units advantageously react in different manner and at least offset with respect to time.

In a further refinement, the power supply unit is configured to provide at least one further operating voltage, wherein a third and a fourth monitoring unit are connected to the further operating voltage, and the third monitoring unit actuates the first switching element if the further operating voltage exceeds a third defined voltage value and the fourth monitoring unit actuates the second switching element if the further operating voltage exceeds a fourth defined voltage value.

In this refinement, the power supply unit provides at least one further operating voltage. This operating voltage is also monitored by way of the two additional monitoring units in order to detect deviations. In the case of an unexpected deviation of the operating voltage, the first and the second switching element are actuated and thus the electrical supply to the power supply unit is interrupted. In this manner, multiple different operating voltages can be generated by the power supply unit, said operating voltages referring back to the same overvoltage protection mechanism.

It is to be understood that the above mentioned features and the features still to be explained below can be used not only in the respectively disclosed combination but also in other combinations or on their own without departing from the scope of the present invention.

BRIEF DESCRIPTION OF THE DRAWING

Exemplary embodiments of the invention are illustrated in the drawing and are further explained in the description below. In the drawing.

DESCRIPTION OF PREFERRED EMBODIMENTS

Figure 1:
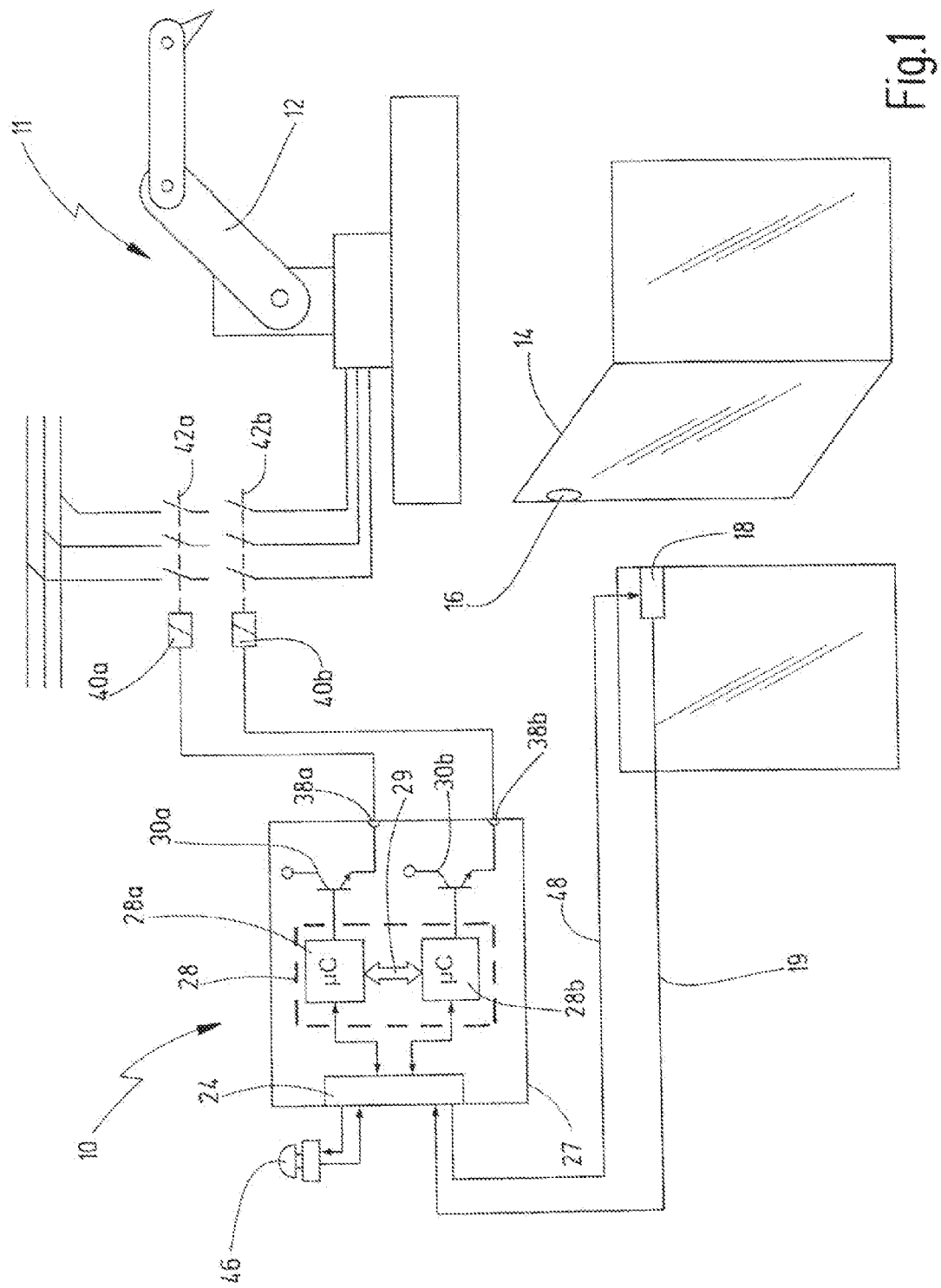
FIG. 1 illustrates a simplified view of an exemplary embodiment of the safety switching device.

FIG. 1 illustrates a simplified view of an exemplary embodiment of the safety switching device 10 for switching on or switching off a hazardous installation 11 in a failsafe manner. In other words, the safety switching device 10 is used for safety-related tasks. By way of example, the installation 11 comprises a robot 12 whose movements during the working operation pose a risk to individuals who are present in the working area of the robot 12. For this reason, the working area of the robot 12 is safeguarded by means of a protective fence having a protective door 14. The protective door 14 allows access to the working area of the robot 12 for maintenance work or for installation work, for example. However, the robot 12 may only operate during the normal working operation if the protective door 14 is closed. As soon as the protective door 14 is opened, the robot 12 must be switched off or transferred into a safe state in a different manner.

In order to detect the closed state of the protective door 14, a protective door switch having a door part 16 and a frame part 18 is attached to the protective door 14. The frame part 18 generates a protective door signal on a line 19 and said protective door signal is transmitted to the novel safety switching device 10 via line 19.

The safety switching device 10 comprises at least one input for receiving an input signal, such as at least one first input for receiving the protective door signal that is transmitted by way of line 19. In this exemplary embodiment, the safety switching device 10 comprises an I/O part 24 having a plurality of inputs and outputs. The inputs and outputs are configured in the form of connections (external or device connections). In some exemplary embodiments, the connections are connecting terminals or field terminals that are arranged on a housing face of a housing 27 of the safety switching device 10. By way of example, said connections can be spring-type terminals or screw-type terminals. In other exemplary embodiments, the connections can be plug-in connectors or sockets that comprise multiple contact elements (pins), wherein in each case one pin forms one connection. Frequently, M8 sockets having five contact pins are used for connecting signaling devices or other sensors to the field plane. Accordingly, exemplary embodiments of the novel safety switching device 10 can be or can comprise field devices that are arranged outside a switching cabinet in the physical proximity of the robot 12.

The safety switch device 10 further comprises a failsafe control/evaluation unit 28. The control/evaluation unit 28 processes the input signal, such as the protective door signal that is transmitted via line 19, in order to generate an output signal for switching on or switching off the hazardous installation 11 in response thereto. In this exemplary embodiment, the failsafe control/evaluation unit 28 comprises two processing units 28a, 28b. The processing units 28a, 28b each are connected to the I/O part 24. The processing units 28a, 28b process the input signal in a redundant manner with respect to one another and perform logic signal operations (e.g. by comparing the signals as is illustrated in FIG. 1 by an arrow 29) in order to generate the output signal in response thereto. The safety switching device 10 therefore comprises two redundant signal processing channels in this exemplary embodiment. The processing units can be provided in the form of microcontrollers, by way of example. In lieu of two microcontrollers, it is possible to use microprocessors, ASICs, FPGAs and/or other signal processing circuits that perform logic operations. The output signal is used for controlling a switching element to switch off robot 12. A safety switching device 10 of this type can therefore be used for switching off the installation 11, in this case the robot 12, in a failsafe (FS) manner.

In the case illustrated here, the safety switching device 10 comprises two redundant switching elements 30a, 30b. Each of these two switching elements is able to connect through a high voltage potential to an output or device connections 38a, 38b of the safety switching device 10 in order to enable current to flow to a contactors 40a, 40b or to interrupt this current flow. Consequently, each of the switching elements 30 can switch off an actuator, such as a contactor or a solenoid valve.

The contactors 40a, 40b each comprise working contacts 42a, 42b. The working contacts 42a, 42b are arranged in this case in series with respect to one another in a current supply path from a current supply 44 to the robot 12. As soon as the safety switching device 10 switches off the contactors 40a, 40b, the contacts 42 open and the current supply to the robot 12 is switched off. It is clear to the skilled persons that a "radical" switch-off of this type is described here by way of example. As an alternative thereto, it is possible in the case of a safety requirement to switch off only parts of the robot 12, such as the dangerous drives, whereas other parts of the robot 12 remain ready to function. A delayed switch-off is also feasible, so that the robot 12 can where necessary be decelerated in a controlled manner prior to switching off the drives.

The safety switching device 10 controls the switching elements 30a, 30b in this exemplary embodiment in response to the signal from the protective door switch on line 19 and in response to a further input signal from an emergency off button 46. The emergency off button 46 is also connected by way of lines to device connections of the safety switching device 10. In particular, the safety switching device 10 comprises a second input for receiving input signals from the emergency off button 46. It is preferred that each of the input signals are present in a redundant manner or rather two input and output lines and connections can be provided in each case (not illustrated in FIG. 1). In the example illustrated in FIG. 1, it is possible to provide for the emergency off button 46 two input lines or inputs that each deliver an input signal from the emergency off button 46. This applies in a similar manner for the signal from the protective door switch.

In some exemplary embodiments, the safety switching device 10 generates output signals that are transmitted to the individual signaling devices. By way of example, an output signal of this type is transmitted by way of a line 48 to the frame part 18 of the protective door switch. The frame part 18 passes the output signal of the safety switching device 10 from the line 48 to the line 19 if the door part 16 is located in the proximity of the frame part 18, in other words if the protective door 14 is closed. The safety switching device 10 can therefore monitor the protective door switch by means of the output signal on the line 48 and by means of the input signal on the line 19. The safety switching device 10 monitors the emergency off button 46 in a similar manner.

Deviating from the illustration in FIG. 1, two redundant output signals from the safety switching device 10 are frequently used in practice, said signals being transmitted in each case by way of a separate signal line to a signaling device and by way of this signaling device back to the safety switching device 10. By way of example for such an implementation process, reference is made to DE 10 2004 020 995 A1 that is included herein by reference with respect to the details of a process of this type for the redundant monitoring of a signaling device. Also, the emergency off button 46 is frequently monitored in practice using redundant input and output lines, as mentioned above.

Figure 2:
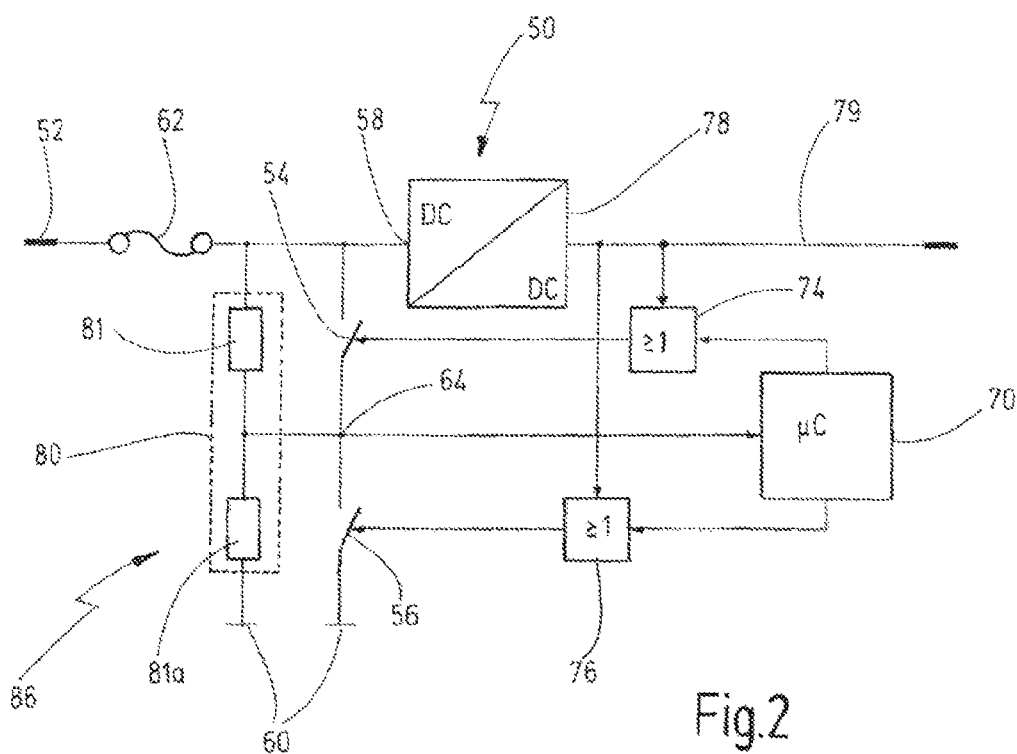
FIG. 2 illustrates a schematic view of an exemplary embodiment of a power supply unit of the safety switching device.

FIG. 2 illustrates a simplified schematic illustration of an exemplary embodiment of the power supply part 50 of the novel safety switching device 10. Primarily, the power supply unit 50 comprises a feed line 52, a voltage convertor 78 and an overvoltage protection device 86, said feed line having an interrupter element 62.

An input voltage is transmitted via line 52 to the voltage convertor 78 and said input voltage is usually provided in the case of safety switching devices by an external power supply unit and is a DC voltage. The voltage converter 78 is consequently a DC voltage converter (DC-DC converter). Alternatively, however, any different DC voltage or AC voltage can also be applied at the input and a corresponding voltage converter used. The voltage converter 78 provides on the output side the operating voltages of by way of example 3.3 V or 5 V that are relevant for the operation of the safety switching device.

The interrupter element 62 in the feed line is dependent on the current and triggers if the current flow through the interrupter element exceeds a defined value. The interrupter element 62 can be embodied by way of example as a simple protection fuse, wherein if a defined current strength is exceeded the fusing element is caused to melt. Alternatively, a complex excess current protection device can also be used, such as by way of example a circuit breaker that interrupts an electrical current circuit if the electrical current exceeds a predefined current strength over a predetermined period of time.

The overvoltage protection device 86 comprises in the exemplary embodiment according to FIG. 2 two series-connected switching elements 54, 56, two monitoring devices 74, 76, a control element 70 and a potential divider 80. The series-connected switching elements 54, 56 connect the feed line 52 downstream of the interrupter element 62 and upstream of the input 58 to a ground connection 60. During proper operation, the two switching elements 54, 56 are open, in other words a current flow to ground 60 is interrupted. If an unexpected state that is hazardous for the components of the power supply part arises, the two switching elements 54, 56 are closed, in other words moved into a low-impedance state and the feed line 52 is short-circuited to ground 60. As a consequence, the current strength in the feed line 52 increases up to the point at which the current strength that is decisive for the interrupter element 62 is exceeded and said interrupter element triggers. After triggering of the interrupter element 62, the input 58 of the voltage converter 78 is completely separated from the feed line 52.

In this exemplary embodiment, two monitoring units 74, 76 are responsible for actuating the switching elements 54, 56. The monitoring units are both connected to the output of the voltage converter 78 and evaluate the voltage that is generated by said voltage converter. It is preferred that the monitoring units are comparators that compare the output voltage 79 with a defined reference voltage. If the output voltage 79 deviates in an atypical manner from a pre-defined desired voltage, the first monitoring unit 74 actuates the first switching element 54 and the second monitoring unit 76 actuates the second switching element 56. If the two switching elements 54, 56 are closed as described above, the interrupter element 62 triggers and the current supply is interrupted.

A reference point 64 is arranged between the first and the second switching element 54, 56 and a voltage value can be captured at said reference point. The voltage value is in the range of a first, second or third expectation value 66, 68, 72 dependent upon the switching state of the first and the second switching element 54, 56. The first expectation value 66 is met if the first switching element 54 is closed and the second switching element 56 is open. The second expectation value 68 is met when the switching elements are in the reverse position, in other words if the second switching element 56 is closed and the first switching element is open. The third expectation value met if the two switching elements 54, 56 are open and the device is being operated in the proper manner. It is preferred that the third expectation value 72 is the mean value from the first and the second expectation value 66, 68, in other words the first expectation value 66 represents a deviation to a higher voltage and the second expectation value 68 represents a deviation to a lower voltage with regard to the third expectation value 72.

The reference point is furthermore connected to the middle contact of a potential divider 80, wherein the potential divider is in turn connected on the input side by way of the interrupter element 62 to the feed line 52. The potential divider 80 increases the voltage at the reference point by a defined offset voltage that is dependent upon the input voltage at the feed line so that the expectation values 66, 68, 72 are also increased. The voltage differences between the first, second and third expectation values 66, 68, 72 remain unchanged. It is preferred that the potential divider 80 is embodied in a symmetrical manner with two identical resistors 81, 81a.

Moreover, the reference point 64 in this exemplary embodiment is connected to a control element 70 that can evaluate the voltage at the reference point 64 and detect deviations from the first, second or third expectation value 66, 68, 72. The control element 70 is furthermore connected to the first and second monitoring unit 74, 76 and is embodied so as to detune or adjust said monitoring units. The term 'detune is understood to mean in this context that a monitoring unit actuates the associated switching element even when the defined voltage is applied at the output of the voltage converter 78. A detuning process can be brought about by way of example in the case of the monitoring units, which are embodied as a comparator, by changing the reference voltage.

Deviations from the expectation values indicate defects in the switching elements 54, 56 of the overvoltage protection device 86. A deviation of the first expectation value 66 indicates a defective first switching element 54 and a deviation of the second expectation value 68 indicates a defective second switching element 56. It is preferred that a deviation of the first and second expectation values is measured in relation to the third expectation value.

In order to perform a test in an automated manner on the switching elements and the proper operation of the overvoltage protection device 86, the control element 70 detunes or adjusts the first and second monitoring units 74, 76 in an alternating manner, as a consequence of which the first and the second switching element 54, 56 are actuated in an alternating manner. The voltage value at the reference point 64 is read back and subsequently compared with the expectation values 66, 68, 72 in order to test if the switching elements 54, 56 are operating in the proper manner. The test is performed continuously during the running operation of the technical installation that is to be monitored 11 without impairing the protection function during the testing procedure.

Figure 2A:
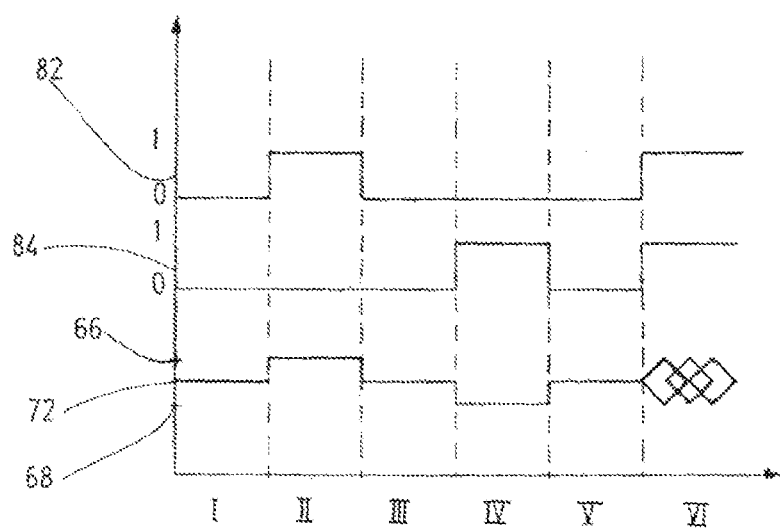
FIG. 2a illustrates a status diagram for the exemplary embodiment shown in FIG. 2.

The diagram shown in FIG. 2*a* clarifies the individual states that the exemplary embodiment shown in FIG. 2 can assume. The diagram is divided for this purpose into 6 sections (I to VI) that each represent a state of the overvoltage protection device 86. The graphs with the reference numerals 82 and 84 illustrate the switching states of the switching elements 54, 56. The first switching element 54 whose state is illustrated by means of the graph 82 is either in the open, non-conductive state (illustrated by a 0), or in the closed, conductive state (illustrated by a 1). The state of the second switching element 56 is evident in a similar manner by means of the graph 84.

The overvoltage protection device 86 is in the normal operation in the sections I, III and V. The term 'normal operation' means in this context that the output voltage is being actively monitored and currently the switching elements are not being tested. The switching elements 54, 56 are open and the voltage value at the reference point 64 is in the region of the third expectation value 72.

Section II illustrates the testing of the first switching element. The first switching element 54 is closed and in the case of the switching element 54 operating in the proper manner, a voltage value in the region of the first expectation value 66 occurs at the reference point 64, said expectation value in this example being greater than the third expectation value 72. Section IV illustrates in a similar manner the testing of the second switching element 56. In this case, the voltage drops to a value in the region of the second expectation value 68 at the reference point 64 in the case of the switching element 56 functioning in a proper manner. In the case of the exemplary embodiment illustrated here, the third expectation value 72 is the mean value of the first and second expectation value 66, 68.

The final section VI illustrates the state of the switching elements 54, 56 in the case of an overvoltage occurring. The first and second switching element 54, 56 are closed, as a consequence of which the feed line 52 is short-circuited to ground 60. An undefined value occurs at the reference point 64 up to the point in time at which the interrupter element 62 triggers and the entire device is separated from the feed line 52.

Figure 3:
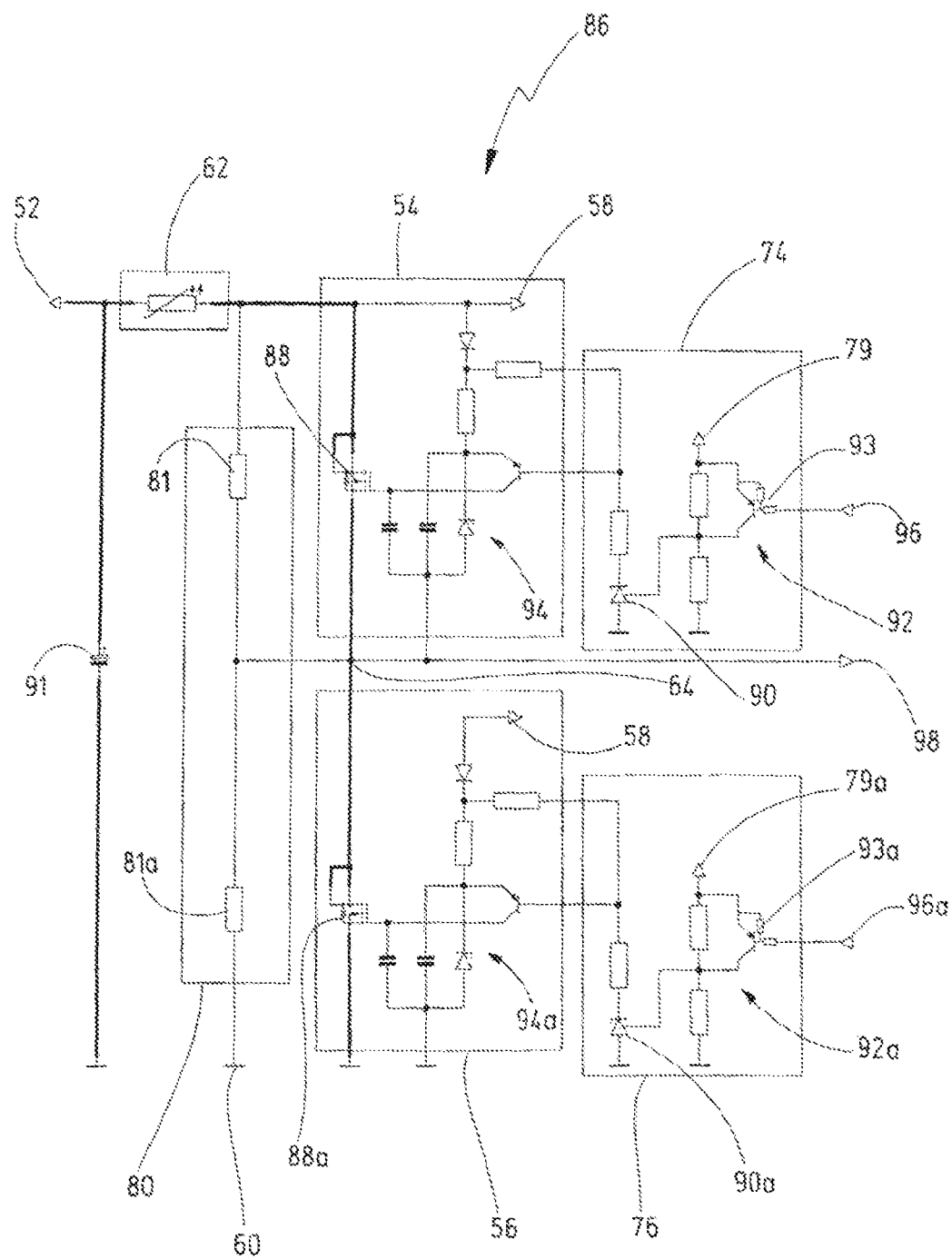
FIG. 3 illustrates an implementation example of the exemplified embodiment shown in FIG. 2.

FIG. 3 illustrates an advantageous implementation using switching technology of the exemplary embodiment shown in FIG. 2, in particular the overvoltage device 86. Like reference numerals describe like parts as shown in FIG. 2. Parallel to the feed line 52, a smoothening capacitor 91 is initially connected in parallel and the interrupter element 62 that is a re-settable PTC fuse in this exemplary embodiment is located downstream of said smoothening capacitor. The parallel connected potential divider 80 is located downstream of the interrupter element 62, said potential divider being embodied in this case from two symmetrical resistors 81, 81*a* and providing on the output side at the reference point 64 an offset voltage that is half the magnitude of the feed line 52.

In the exemplary embodiment illustrated in FIG. 3, the voltage by way of example 24 V that is applied at the feed line 52 is provided by an external power supply unit. The feed line 52 is connected by way of the interrupter element 62 to the input 58 of the power supply unit (not illustrated here). In the case of the power supply unit that is not illustrated, said power supply unit can be a DC-DC converter that converts the input voltage of in this case 24 V into an output voltage 79, 79*a* of in this case 3.3 V. The output voltage 79, 79*a* of the power supply unit is connected to the first and second monitoring unit 74, 76 of the overvoltage protection device 86.

The first and second monitoring unit 74, 76 connects respectively the output voltage 79, 79*a* by way of a potential divider 92, 92*a* to a reference element 90, 90*a*. The reference elements 90, 90*a* are in this case variable Zener shunt controllers. If the output voltage 79, 79*a* that is to be provided is greater than the highest output voltage that is defined by the potential divider 92, 92*a* and the reference element 90, 90*a*, the first and the second switching element 54, 56 are actuated. The first and the second switching element 54, 56 are connected in series and connect the feed line downstream of the interrupter element 62 to the ground connection 64. It is preferred that the switching elements are self-locking n-channel-MOSFETs 88, 88*a* that are connected respectively by way of a control circuit 94, 94*a* to the reference element 90, 90*a*. If the two switching elements are closed as a result of a deviating output voltage 79, 79*a*, the feed line 52 is short-circuited and the interrupter element 62 is trigged.

The circuit further provides that each monitoring unit 74, 76 can be detuned or adjusted separately. For this purpose, the controllable reference voltage of the reference element 90, 90*a* is changed. The reference voltage is set by way of a potential divider 92, 92*a*, wherein the first resistor of the potential divider 92, 92*a* can be bridged by means of an additional switching element 93, 93*a*. The bridging arrangement causes the output-side voltage of the potential divider 92, 92*a* and consequently the reference voltage of the reference element 90, 90*a* to change. The adjustment of the reference voltage subsequently leads to the associated switching elements 54, 56 being actuated. The detuning of the first monitoring unit 74 is performed by way of a signal that is present at the connection 96 and actuates the switching element 93. The second monitoring unit 76 is detuned in a similar manner by way of the connection 96*a* and the switching element 93*a*. The switching elements 54, 56 can thus be actuated individually automatically by means of a logic signal by way of example by means of a control element not illustrated in detail.

Moreover, it is possible to measure the voltage at the reference point 64 by way of the connection 98 and thus in the manner previously described to test the operativeness of the switching elements 54, 56 and associated therewith the operativeness of the entire overvoltage protection device 86.

What is claimed is:

1. A safety switching device for switching on or switching off a technical installation in a failsafe manner, comprising:
   an input for receiving an input signal representing a safety condition,
   a failsafe control/evaluation unit that processes the input signal in order to generate an output signal for switching on or switching off the technical installation in response thereto,
   a power supply unit for providing at least one operating voltage for the control/evaluation unit, the power supply unit having an input side and an output side, said input side having a power input connected to a feed line and a ground connection for receiving an external input voltage provided between the feed line and the ground connection, and the power supply unit providing said at least one operating voltage at the output side, a first and a second switching element arranged in series and bridging the power input to the ground connection, and an interrupter element arranged between the power input and the feed line, which interrupter element triggers when both the first and the second switching elements are in a closed, low-impedance state, wherein a reference point is defined between the first and the second switching elements, which reference point has a voltage value that corresponds to a first expectation value when the first switching element is in the closed, low-impedance state and the second switching element is in an open state, and said voltage value corresponds to a second expectation value when the first switching element is in an open state and the second switching element is in the closed, low-impedance state.

2. The safety switching device of claim 1, further comprising a control element that selectively actuates the first or the second switching element and compares the voltage value at the reference point with the first and second expectation value.

3. The safety switching device of claim 1, further comprising a third expectation value that occurs at the reference point if both the first switching element and the second switching element are in the open state.

4. The safety switching device of claim 1, wherein the interrupter element does not trigger if only the first or the second switching element is in the closed, low-impedance state.

5. The safety switching device of claim 1, further comprising a first monitoring unit and a second monitoring unit that are connected to the at least one operating voltage, wherein the first monitoring unit actuates the first switching element if the at least one operating voltage exceeds a first defined voltage value, and the second monitoring unit actuates the second switching element if the at least one operating voltage exceeds a second defined voltage value.

6. The safety switching device of claim 5, wherein the first and second defined voltage values are adjustable.

7. The safety switching device of claim 5, further comprising a control element that can adjust at least one of the first and second monitoring units independently of the at least one operating voltage.

8. The safety switching device of claim 1, wherein the failsafe control/evaluation unit comprises at least two processing units that process the input signal in a redundant manner with respect to one another and perform logic signal operations in order to generate the output signal in response thereto.

9. The safety switching device of claim 8, wherein the at least two processing units operate with different operating voltages.

10. The safety switching device of claim 1, wherein the power supply unit is configured to generate at least one further operating voltage, wherein a third and a fourth monitoring unit are connected to the further operating voltage, the third monitoring unit actuating the first switching element if the further operating voltage exceeds a third defined voltage value and the fourth monitoring unit actuating the second switching element if the further operating voltage exceeds a fourth defined voltage value.

11. A method for monitoring a power supply unit of a safety switching device for switching on or switching off a technical installation in a failsafe manner, the method comprising the steps of:

providing a safety switching device having an input for receiving an input signal, a failsafe control/evaluation unit that processes the input signal in order to generate an output signal for switching on or switching off the technical installation in response thereto, and a power supply unit that has a power input and a ground connection, said power supply unit generating at least one operating voltage for the control/evaluation unit, supplying electrical power to the power supply unit via a feed line and a ground connection, arranging a first and a second switching element in series between the feed line and the ground connection, arranging an interrupter element in the feed line, actuating the first and second switching elements in an alternating manner, and monitoring a voltage value at a reference point between the first and the second switching elements, wherein the voltage value is expected to correspond to a first expectation value in the case of a closed, low-impedance state of the first switching element and in the case of an open state of the second switching element, and wherein the voltage value is expected to correspond to a different second expectation value in the case of an open state of the first switching element and a closed, low-impedance state of the second switching element, and triggering the interrupter element in order to disconnect the power supply unit from the electrical power if the voltage value at the reference point does not correspond to either the first or the second expectation value.

12. The method of claim 11, wherein the interrupter element is triggered by bringing both the first and the second switching elements into the closed, low-impedance state.

* * * * *